US005951778A

United States Patent [19]
Wolbarsht et al.

[11] Patent Number: 5,951,778
[45] Date of Patent: Sep. 14, 1999

[54] METHOD FOR CLEANING ARTWORK

[75] Inventors: Myron L. Wolbarsht, Durhan, N.C.; Adele deCruz, 124 E. 72nd St., New York, N.Y. 10021

[73] Assignee: Adele deCruz, New York, N.Y.

[21] Appl. No.: 09/151,161

[22] Filed: Sep. 10, 1998

[51] Int. Cl.[6] .............................. B08B 7/00; B23K 26/00

[52] U.S. Cl. .................... 134/1; 219/121.69; 219/121.84

[58] Field of Search ........................... 134/1; 219/121.61, 219/121.69, 121.84, 121.78

[56] References Cited

U.S. PATENT DOCUMENTS

| | | | |
|---|---|---|---|
| 3,706,942 | 12/1972 | Ultee | 372/89 |
| 4,588,885 | 5/1986 | Lovoi et al. | 250/226 |
| 4,756,765 | 7/1988 | Woodroffe | 134/1 |
| 5,151,134 | 9/1992 | Boquillon et al. | 134/1 |
| 5,268,548 | 12/1993 | Kumar | 219/10.55 |
| 5,368,900 | 11/1994 | Jelley et al. | 219/121.69 |
| 5,560,781 | 10/1996 | Banks et al. | 134/1 |
| 5,637,245 | 6/1997 | Shelton et al. | 219/121.69 |
| 5,656,096 | 8/1997 | Van Alstyne | 134/1 |
| 5,729,646 | 3/1998 | Miyagi et al. | 385/125 |

OTHER PUBLICATIONS

Applied Optics, vol. 34, #21, Jul. 20, 1995, by Katherine Liu and Elsa Garmire, pp. 4409–4415.

Optics & Photonics News of May, 1995, entitled: "Lasers for Art's Sake!" by Costas Fotakis pp. 30–35.

NASA Tech Briefs of Apr., 1996 entitled: "Atomic Oxygen Removes Varnish and Lacquer from Old Paintings".

Optics & Laser Technology, vol. 27, #1, 1995 by M.I. Cooper, D.C. pp. 69–73 Emmony, & J. Larson entitled: Characterization of Laser Cleaning of Limestone.

Electronic Engineering Times of Monday, Aug. 14, 1995, Issue 861.

Palladio, Quanta System, "Pulsed Nd:YAG Laser for Fine Art Conservation".

*Primary Examiner*—Jill Warden
*Assistant Examiner*—Saeed Chaudhry
*Attorney, Agent, or Firm*—William M. Hobby, III

[57] ABSTRACT

The present invention is a method of cleaning artwork by removing contaminates from a painted or patina surface of the artwork. A pulsed laser is used having a wavelength of between 2.3 and 3.3 μm, such as an Er:YAG having a wavelength of 2.94 μm, to stimulate the presence of an OH radical contained in the contaminant film layer to be removed or introduced to the paint surface contaminated film using an OH containing agent applied with a brush, cotton swab or spray. The surface to be removed is covered by a glass cover slip and has the laser energy impinged thereon. The laser energy interacts with the OH radical present in the contaminant or introduced into the surface by the operator. The reaction of the laser energy with the OH radical deposits the contaminated film material onto the glass slide cover. Contaminants that remain on the paint surface can then be removed by scalpel or cotton swab using a wetting agent.

28 Claims, No Drawings

METHOD FOR CLEANING ARTWORK

BACKGROUND OF THE INVENTION

The present invention relates to a method for cleaning the surface of artwork painted surface lacquered, patina surface especially to a cleaning process using a laser of predetermined wavelength to interact with an agent in a contaminant surface on the artwork.

Laser technology is used in the field of painting conservation, to remove varnish films, polymerized overpaint, or calcium carbonate gesso layers (i.e. metallic or organic bonds) which cover and obscure oil paint films on canvas, wood, terracotta, paper, cardboard, metal, leather, parchment, plaster, and marble supports. The traditional method of cleaning painting surfaces is to dissolve or soften natural resin varnish films, overpaint or polymerized synthetic resin varnish, using aromatic or alkaline solvent. The solvent dissolves the substance or loosens its adhesive bond by penetrating the structure and breaking its molecular bonding. Normally a natural resin varnish or accumulation of soot and grease is dissolved with a mild solvent with little or no penetration into the paint layer, because the dissolved film is immediately neutralized as it turns to solute. When, however, a color surface is covered by a cross-linked or partially cross-linked varnish or paint layer, the solvent penetration requires a substantial rate of attack which means the solvent strength must be increased.

All color surfaces covered by overpaint or polymerized synthetic resins are in danger of dissolving, causing pigments with lesser covering and bonding properties to abrade. This is true of all carbon and organic colors, such as black, umber, earth green and earth red, and the like.

Typically when a solvent is applied to a polymerized film, the film resists dissolving. As the solvent continues to penetrate the film, soluble material locked in the paint film, such as triglycerides of the saturated kind formed from palmitic and stearic acids, starts to diffuse out of the film. This leaching causes a swelled state as the volume of the film increases and softens. The longer the paint film is exposed to the chemical action of a solvent, the greater the leaching action. The paint film may not dissolve after leaching and swelling has taken place but it is more brittle and has a decreased volume due to leaching. The chemical and physical bonding state of such paint films are permanently weakened and will most likely be susceptible to abrasions and paint loss in the future when the varnish layer used to replace the one cleaned must itself be removed. All Old Master paintings that have been cleaned in this century will be susceptible to this inevitable damage when they are next in need of cleaning.

The chemical and physical problems which endanger paint films when natural resin and synthetic varnishes are removed by aromatic solvents has been defined so that conservators have been aware of the problems which surround the cleaning of a painted surface. All varnish layers discolor and yellow over time, and, in so doing, obscure the color surface. This problem is compounded when the original color surface has been overprinted or covered with mediums which polymerize or partially polymerize with the color surface.

Lasers can be used to safely remove varnish and overpaint adhesives which cover a paint surface without endangering the oil paint film. This requires that the power, exposure time, pulse width, frequency, or wavelength have been properly selected and adjusted to the paint surface encrustation. In cases of overpaint, the laser's ability to vaporize inorganic bonds has been technically possible for many years. In the case of organic varnish layers, the removal has been technically possible for a number of years.

Objections to the use of lasers have been centered around the cumulative thermal effects of the exposure on the organic paint film. This objection is valid when purely heating effects are used to remove layers, and successful tests to remove overpaint and cross-linked synthetic varnish were conducted with argon and ruby lasers as early as 1978.

The present invention uses infrared wavelengths, such as a pulsed Erbium:YAG laser, and has shown that application of a pulsed laser with selected thermal interaction can successfully remove polymerized overpaint and synthetic varnishes as well as organic encrustation, adhesives, and natural resin varnish without endangering the color surface. This is possible because of the selection of a laser wavelength and power which allows minimal penetration and selective non-thermal removal of organic materials. Films of opaque or semi-opaque characteristics are safely removed by vaporizing the adhesive bonding without penetrating or heating the original color film surface. This control is absolutely impossible when considering the penetration of aromatic and alkaline solvents. This is true even when the solvents are suspended in gel because the penetration of the solvent gas which dissolves the varnish resin or overpaint creates the same internal swelling.

Prior U.S. patents which use lasers in cleaning surfaces can be seen in the Boquillon et al. U.S. Pat. No. 5,151,134, for a method and device for cleaning a surface with a laser. A process and device for cleaning pollutants from a surface uses a laser for applying laser pulses to the surface to be cleaned in which the laser is pulsed in pulse durations not exceeding 30 nanoseconds. The area on the surface is contacted with the pulsating laser and the surface is cleaned in the absence of an observably thermal effect and the laser is removed from the area on the surface after the area is cleaned. The process removes pollutants from a surface of material selected from the group consisting of stone, glass, steel, ceramics, wood, paper and cardboard. The Lovoi et al. U.S. Pat. No. 4,588,885, is a method of an apparatus for the removal of paint and the like from a substrate. A method and apparatus controls the stripping of paint from a substrate by pulses of high intensity radiant energy. The Woodroffe U.S. Pat. No. 4,756,765, uses a laser to remove poor thermally conductive materials, such as paint, grease, and ceramics, from a substrate by ablation without damaging the substrate by delivering to the material to be removed pulses of a laser beam having a wavelength at which the material to be removed is opaque. Laser energy is used which is sufficient to ablate or decompose the material without damaging or adversely affecting the substrate or its surface. The Kumar U.S. Pat. No. 5,268,548, is a method of removing paint and other coating from large and small substrate structures including applying to the surface of the structure a compound capable of coupling with a microwave radiation in the wavelength range for causing pyrolysis of the paint.

The following articles also deal with the cleaning of surfaces using lasers. In Applied Optics, Volume 34, No. 21, Jul. 20, 1995, an article by Katherine Liu and Elsa Garmire discusses paint removal using lasers as a practical way to remove graffiti from building walls. A variety of lasers were tested and the article suggests a Q-switched Nd:YAG laser as the most efficient means for removing graffiti and unwanted paint. An article entitled "Lasers for Art's Sake!" in Optics & Photonics News of May, 1995, by Costas Fotakis discusses using modern laser technology to improve the conservation and non-destructive diagnostics and composition analysis of paintings. In particular, Excimer lasers are indicated as a promising tool for surface cleaning of paintings, cleaning support materials, such as a canvas, paper, or wood, and recovering original paintings from over-paintings. The technique is based on the controllable removal of surface layers by photoablation. In the NASA Tech Briefs of April, 1996, entitled "Atomic Oxygen Removes Varnish and Lacquer From Old Paintings" a dry relatively nondestructive plasma process is suggested to remove protective coats of varnish and/or lacquer from old paintings. In an article in Optics & Laser Technology, Vol 27, No. 1, 1995 by M. I. Cooper, D. C. Emmony, and J. Larson entitled "Characterization of laser cleaning of limestone", a precise cleaning of a polluted limestone sculpture by a Q-switched Nd:YAG laser is described. In the Electronic Engineering Times of Monday, Aug. 14, 1995, Issue 861, an article discusses using a laser in cleaning articles and supports using an Excimer laser to clean roman coins and metal plates. These prior articles indicate an interest in the use of lasers for cleaning various types of artworks including oil paintings.

The present invention is a process for improving the cleaning of a painted surface using a laser in the removal of varnish films, polymerized over-paint, adhesives, calcium carbonate gesso layers, and the like, which cover and obscure paint, lacquered or patina films on canvas, wood, cardboard, paper, leather, parchment, metals, terracotta, marble and stone supports. Improvements result from the selection of a laser with a predetermined wavelength and power to allow minimal penetration used in combination with the presence of an OH radical in the substrate to be removed or which is first applied to an area of the surface prior to the application of laser energy to the coated painted, lacquered or patina surface and, in some cases, the use of a cleaning agent to remove the loosened materials from the laser treated coated area.

SUMMARY OF THE INVENTION

A method of removing contaminates from a painted lacquered or patina surface of an artwork using a pulsed laser having a wavelength of between 2.3 and 3.3 μm, or between 5.5 or 6.5 μm, such as an Er:YAG having a wavelength of 2.94 μm, Er:YAG YSG, or a pulsed hydrogen fluoride laser, to stimulate the presence of an OH bond (or radical) contained in the contaminant film layer or introduced into the contaminated film with an OH containing agent applied with a brush, cotton swab or spray. Examples of contaminates to be removed include short chain natural resin varnish, synthetic resins, long chain polymers, and adhesives, both natural and synthetic, and inorganic salts, both halogens and metals, and all compounds which combine with an OH radical. The surface to be removed is covered by a glass cover slip and exposed to the laser energy. The laser energy interacts with the OH group or OH radical present in the contaminant.

The reaction of the laser energy with the OH radical deposits the contaminated film material onto the glass slide cover. Contaminants that remain on the paint surface can then be removed by scalpel or cotton swab using a wetting agent.

The present invention is a process for improving the cleaning of painted lacquered and patina surfaces by the removal of contaminant films, such as varnish films, polymerized overpaint, and calcium carbonate gesso layers which cover and obscure the painted surface. The process includes selecting an agent containing an OH bond or radical, such as distilled water, alcohol, including isopropyl alcohol, acetone, and ethanol for use in cleaning a painted surface. The selected OH containing agent is applied to a predetermined surface area of an artwork to be cleaned. A selected laser of a predetermined wavelength between 2.3 and 3.3 μm, or 5.5 and 6.5 μm, such as an Erbium:YAG laser having a wavelength of about 2.94 μm and directing the laser energy onto the area of the painted surface where the OH radical is present at a predetermined energy level for a selected number of laser pulses. Materials loosened by the laser energy interacting with the OH radical is then removed either as dry material or with a wetting agent.

DESCRIPTION OF THE PREFERRED EMBODIMENT

The present method is for cleaning artwork by the removal of contaminates from a painted lacquered or patina surface using a pulsed laser, such as an Erbium:YAG laser, to apply laser energy onto a contaminate surface on the artwork having an OH bond or OH radical in the contaminate surface. It has been found to be especially effective in painting conservation to remove varnish films, polymerized overpaint, and calcium carbonate gesso layers, such as metallic and organic bonds, which cover and obscure oil, tempera, watercolor, or lacquered paint films on canvas, wood, and terracotta paper, cardboard, parchment, leather, metal, marble, and stone supports. A laser having a wavelength of 2.3 to 3.3 μm or 5.5 to 6.5 μm, such as an Erbium:YAG laser having a wavelength of 2.94 μm. Other lasers working within these ranges might include a pulsed hydrogen fluoride laser or Er:YAG YSGG. The method is anticipated as replacing and improving the cleaning of paint films or patina over that used in the prior art in which aromatic or alkaline solvents have been used for cleaning the surface of artwork. The surface of a selected artwork, such as a paint lacquered or patina surface, has a first application of a selected agent having an OH radical applied thereto, followed by the impinging of laser energy of a predetermined wavelength at a predetermined energy level to the agent coated area. The process includes selecting an artwork, such as an oil painting, to be cleaned and then selecting a agent having an OH radical, for use in cleaning the artwork, such as distilled water and alcohols, including isopropyl alcohol and ethanol, and ammonia. An OH bond and an OH group and an OH radical are used herein to mean an atom of oxygen and an atom of hydrogen which together act as a unit and forms a part of a molecule. The agent is selected to be absorbent in the contaminate film over the paint surface while not being readily absorbent in the paint and is applied to the surface of the painting, such as with a fine mist, swab or soft brush. Once the applied agent has penetrated the contaminate film, a pulsed mid-infrared laser, such as an Erbium:YAG laser, having a wavelength of 2.94 μm is positioned to direct the pulses of laser energy directly onto the painting surface. A predetermined number of pulses of a selected energy level of laser energy are applied to the surface of the contaminate film covering the painting and thereafter the loosened material is removed. The contaminate film is ablated from the surface without damaging the surface of the painting. Materials that are not ablated are softened and easily removed by wiping with a solvent or with a scalpel.

The surface to be removed is covered with a glass cover slip before being exposed to the laser energy. The reaction of the laser energy with the OH group deposits the contaminated film material onto the glass slide cover. Contaminants that remain on the paint surface can then be removed by scalpel or cotton swab using a wetting agent. Typically, low energy pulses having an energy level of from 9 mj per pulse to 28 mj per pulse has been found to be effective on a painted surface using 250–2,000 pulses over an area of one square centimeter.

The process has been used to remove short chain natural resin varnish, synthetic resins, long chain polymers, and adhesives, both natural and synthetic, and inorganic salts, both halogens and metals, and all compounds which combine or absorb agent having OH radical. An Er:YAG laser has safely removed deposits of grease, soot, varnish, and adhesive overpaint from original painted surfaces when these materials are exposed to a combination of a laser at the predetermined wavelength and energy levels and have an OH radical therein.

The application of distilled water, alcohol, glycol and ammonia cause the interaction that lifts the materials from the artwork surface. The preferred delivery of the laser beam to the artwork is with a hollow glass waveguide or an articulated arm but any other delivery system desired can be used without departing from the spirit and scope of the invention. For instance, a fiber beam delivery may be used by placing the artwork at a focal point distance from the beam pulse where the pulse is emitted from the fiber. The process utilizes a staple laboratory table with the artwork positioned flat on the table or on an easel or wall. The artwork is covered with a glass cover after an agent having an OH radical therein has been applied to the surface of the artwork being cleaned. Successful cleaning without damage to the painting surface has been accomplished at a pulse rate of 10 Hz and an energy level of 10.5 mj increased by about 60% at 5 Hz to 17 mj. The surface to be removed is prepared by moistening the area to be exposed with the agent and covered with a glass cover. The effective ablation of the film to be removed is determined by presence of Ott radicals of the agent, i.e. water or alcohol, into the film when it is stimulated by the laser pulses. Interaction to the laser light occurs at 2.940 $\mu$m with the Er:YAG laser. The technique used to remove the surface material depends on the contaminate film substance. For example, flake or plate removal of paper is accomplished by moistening the pulsed area, applying the laser energy, and removing the film with a scalpel.

EXAMPLE 1

A 19th Century oil on canvas which has never been varnished and is covered with soot adherent cross-linked to the oil paint. A 1 cm area is lightly moistened with ammonia and is covered with a glass plate and exposed with an Er:YAG laser at 42 mj pulsed at a 5 Hz repetition rate over the 1 $cm^2$ area for 330 pulses. This produced excellent results in removing the soot covering on the oil paint.

EXAMPLE 2

A 15th Century tempra on wood panel is covered by a discolored thick layer of shellac, soot and candle wax. A 1 $cm^2$ area is lightly coated with alcohol and covered with a glass cover. A single pass of an Er:YAG laser with 625 pulses at about 10 mj per pulse cleans the discoloring layer.

EXAMPLE 3

A 17th Century oil on canvas painting has the verso of canvas covered with a thick layer of water soluble adhesive. One square inch is treated with alcohol and then a single pass of 190 pulses from an Er:YAG laser with an output of 12.5 mj per pulse at the output removes the thick brittle layer of water soluble adhesive.

EXAMPLE 4

An oil painting on cardboard, circa 1895, is covered by a dark layer of soot and discolored varnish. A 1 $cm^2$ area is pretreated with alcohol and 250 pulses from an Er:YAG laser at 12.5 mj per pulse at the output of the laser to remove the covering of the dark layer of soot and discolored varnish.

EXAMPLE 5

A 19th century lithograph and ink on paper is covered with stains from scotch tape and masking tape. A one square inch area of the tape is pretreated with distilled water and has 575 pulses at 12.5 mj per pulse of laser energy from an Er:YAG laser is impinged thereon followed by a second pass of the laser for 440 pulses to successfully removes the glue.

EXAMPLE 6

A sketch on wove paper has water stains along the edge and is slightly dampened with alcohol over the stained area and impinged with a laser beam for 440 pulses at 10 Hz from an Er:YAG laser producing 10 mj per pulse. This is followed by treatment with isopropyl alcohol to remove the water stains.

EXAMPLE 7

A 16th Century oil on wood panel is covered with a residue of 18th Century oil color overpaint. An area is pretreated with isopropyl alcohol and covered with a glass cover. 90 pulses from an Er:YAG laser at 16 mj pulses at 10 Hz removes the top layer of overpaint comes.

EXAMPLE 8

A 15th Century oil on canvas painting as a one square inch area coated with ethanol and covered with a glass cover. 340 pulses at 13 mj per pulse of laser energy from an Er:YAG laser is impinged at 10 Hz. Ethanol is then applied to the surface for removal of soot down to the original surface.

EXAMPLE 9

An oil on canvas painting has a ½" square area pretreated with distilled water and covered with a glass cover and then has laser energy from an Er:YAG laser at 13 mj per pulse applied at a rate of 10 Hz for 1200 pulses. The area is dampened a second time with distilled water and a second pass from the laser at 980 pulses at 10 Hz and distilled water is applied to evenly clean the surface without abrasion.

EXAMPLE 10

A 15th Century oil and canvas painting has a 1½ sq. inch area pretreated with ethyl alcohol and is covered with a glass cover and has an Er:YAG laser directed thereonto for 772 pulses at 10 Hz with an output energy level of about 10 mj per pulse. The area is then cleaned with ethyl alcohol.

It should be clear at this time that a process for cleaning artwork and especially a process utilizing an infrared laser in combination with selected agents having OH radical has been provided which any contaminates which can absorb the agent having the OH radical to and removes the contaminates including varnish films, overpaint and gesso layers and the like. However, it should also be clear that the present invention is not to be limited to the forms shown which are to be considered illustrative rather than restrictive.

I claim:

1. A method of cleaning a painted, patina or lacquered surface of an artwork, comprising the steps of:

selecting an agent having an OH group for use in cleaning an artwork surface;

applying said selected agent to a predetermined surface area of an artwork to be cleaned;

selecting a laser of predetermined wavelength that selectively interacts with an OH group having a wavelength between 2.3 μm and 3.3 μm or between 5.5 μm and 6.5 μm; and directing laser energy from said selected laser at a predetermined energy level onto the surface area of an artwork having the selected agent applied thereover, whereby an area of an artwork surface is cleaned.

2. A method of cleaning a painted, patina or lacquered surface of an artwork in accordance with claim 1 including the step of removing loosened material from said predetermined surface area following the application of laser energy thereto.

3. A method of cleaning a painted, patina or lacquered surface of an artwork in accordance with claim 2 in which the step of removing loosened material from said predetermined surface area includes applying a selected solvent to the surface area of an artwork following the application of laser energy thereto.

4. A method of cleaning a painted, patina or lacquered surface of an artwork in accordance with claim 1 in which the step of selecting an agent includes selecting distilled water.

5. A method of cleaning a painted, patina or lacquered surface of an artwork in accordance with claim 1 including the step of covering a portion of the artwork with a glass cover prior to directing laser energy onto the surface of the artwork.

6. A method of cleaning a painted, patina or lacquered surface of an artwork in accordance with claim 1 in which the step of selecting an agent includes selecting alcohol.

7. A method of cleaning a painted, patina or lacquered surface of an artwork in accordance with claim 6 in which the step of selecting an agent includes selecting isopropyl alcohol.

8. A method of cleaning a painted, patina or lacquered surface of an artwork in accordance with claim 6 in which the step of selecting an agent includes selecting ammonia.

9. A method of cleaning a painted, patina or lacquered surface of an artwork in accordance with claim 6 in which the step of selecting an agent includes selecting ethanol.

10. A method of cleaning a painted, patina or lacquered surface of an artwork in accordance with claim 1 in which the step of selecting a laser includes selecting an Er:YAG laser.

11. A method of cleaning a painted, patina or lacquered surface of an artwork in accordance with claim 1 in which the step of selecting a laser includes selecting a pulsed hydrogen fluoride laser.

12. A method of cleaning a painted, patina or lacquered surface of an artwork in accordance with claim 1 in which the step of directing laser energy from said selected laser at a predetermined energy level onto the surface area of an artwork includes selecting an Er:YAG laser and directing laser energy of from 9 mJ/pulse to 100 mJ/pulse onto the area of an artwork having the selected agent applied thereover.

13. A method of cleaning a painted, patina or lacquered surface of an artwork in accordance with claim 1 in which the step of removing loosened material from said predetermined surface area includes applying distilled water to the surface area of a painted surface following the application of laser energy thereto.

14. A method of cleaning a painted, patina or lacquered surface of an artwork in accordance with claim 1 in which the step of removing loosened material from said predetermined surface area includes applying a alcohol to the surface area of a painted surface following the application of laser energy thereto.

15. A method of cleaning a painted, patina or lacquered surface of an artwork in accordance with claim 14 in which the step of removing loosened material from said predetermined surface area includes applying isopropyl alcohol to the surface area of a painted surface following the application of laser energy thereto.

16. A method of cleaning a painted, patina or lacquered surface of an artwork in accordance with claim 1 including coupling said selected laser to a hollow glass waveguide for delivering the laser energy to the surface of a piece of artwork.

17. A method of cleaning a painted, patina or lacquered surface of an artwork in accordance with claim 16 including the step of coupling said selected laser to an articulated arm.

18. A method of cleaning a painted, patina or lacquered surface of an artwork in accordance with claim 1 in which the step of applying said selected agent to a surface includes applying said selected agent in a mist.

19. A method of cleaning a painted, patina or lacquered surface of an artwork in accordance with claim 1 in which the step of applying said selected agent to a surface includes applying said selected agent with a brush.

20. A method of cleaning a painted, patina or lacquered surface of an artwork in accordance with claim 1 in which the step of applying said selected agent to a surface includes applying said selected agent in a swab.

21. A method of cleaning an artwork surface, comprising the steps of:

selecting a laser of predetermined wavelength between 2.3 μm and 3.3 μm or between 5.5 μm and 6.5 μm;

selecting an agent having an interaction with the selected laser wavelength;

applying the selected agent to the surface of an artwork to be cleaned; and directing laser energy from said selected laser at a predetermined energy level onto the surface area of an artwork having the selected agent applied thereover, whereby an area of a painted surface is cleaned.

22. A method of cleaning artwork in accordance with claim 21 including coupling said selected laser to a hollow glass waveguide for delivering the laser energy to the surface of a piece of artwork.

23. A method of cleaning artwork in accordance with claim 21 in which the step of selecting a laser includes selecting an Er:YAG laser.

24. A method of cleaning artwork in accordance with claim 21 in which the step of selecting an agent includes selecting agent having an OH radical for use in cleaning an artwork surface.

25. A method of cleaning artwork in accordance with claim 21 including the step of placing a glass cover over a selected surface of an artwork to be cleaned and directing laser energy onto the surface area of the artwork through the glass cover.

26. A method for cleaning the surface of an artwork comprising the steps of:

placing a glass cover over a portion of the surface of an artwork to be cleaned;

selecting a laser of predetermined wavelength that selectively interacts with an OH radical; and directing laser energy from said selected laser at a predetermined level through said glass cover onto a surface area of an art work, whereby an area of the surface of an artwork is cleaned.

27. A method of cleaning artwork in accordance with claim 26 including coupling said selected laser to an articulated arm hollow glass waveguide for delivering the laser energy to the surface of a piece of artwork.

28. A method of cleaning artwork in accordance with claim 26 including coupling said selected laser to a hollow glass waveguide for delivering the laser energy to the surface of a piece of artwork.

* * * * *